(12) United States Patent
Kakani

(10) Patent No.: US 9,705,768 B2
(45) Date of Patent: Jul. 11, 2017

(54) DISTRIBUTED FAULT ISOLATION IN CONNECTED NETWORKS

(71) Applicant: CA, Inc., New York, NY (US)

(72) Inventor: Balram Reddy Kakani, Telangana (IN)

(73) Assignee: CA, Inc., New York, NY (US)

( * ) Notice: Subject to any disclaimer, the term of this patent is extended or adjusted under 35 U.S.C. 154(b) by 9 days.

(21) Appl. No.: 14/852,980

(22) Filed: Sep. 14, 2015

(65) Prior Publication Data
US 2017/0078174 A1   Mar. 16, 2017

(51) Int. Cl.
*H04L 12/26* (2006.01)
*H04L 12/24* (2006.01)

(52) U.S. Cl.
CPC ...... *H04L 43/0811* (2013.01); *H04L 41/0631* (2013.01); *H04L 41/12* (2013.01)

(58) Field of Classification Search
CPC ... H04L 43/0811; H04L 41/12; H04L 41/0631
See application file for complete search history.

(56) References Cited

U.S. PATENT DOCUMENTS

| 5,436,909 A | 7/1995 | Dev et al. | |
|---|---|---|---|
| 5,727,157 A * | 3/1998 | Orr | G06F 11/2257 709/223 |
| 2003/0051195 A1 * | 3/2003 | Bosa | H04L 41/0618 714/43 |

* cited by examiner

*Primary Examiner* — Mohammad Anwar
(74) *Attorney, Agent, or Firm* — Baker Botts L.L.P.

(57) ABSTRACT

A method is described for determining, via a local fault poller, a list of local unreachable devices of a plurality of devices within a local domain, wherein the local unreachable devices are coupled for communication with the local fault poller. The method comprises determining selected neighboring domains of a plurality of neighboring domains, wherein the selected neighboring domains comprise neighboring devices which are coupled for communication with the local unreachable devices, each neighboring domain having a respective neighboring global fault poller. The method comprises requesting an operational test of the local unreachable devices from the respective neighboring global fault pollers of the selected neighboring domains, and receiving responses, via the respective neighboring global fault pollers, indicating whether the local unreachable devices are operational. The method further comprises determining, based on the responses, a root cause device from the list of local unreachable devices.

20 Claims, 15 Drawing Sheets

DISTRIBUTED FAULT ISOLATION IN CONNECTED NETWORKS

BACKGROUND

The present disclosure relates to interfaces and, in particular, to a system, a computer program product, and method for determining a root cause device in connected networks.

SUMMARY

According to an embodiment of the present disclosure, a method is disclosed comprising determining, via a local fault poller, a list of local unreachable devices for a local domain, wherein the local domain comprises a plurality of devices, wherein the local unreachable devices are within the local domain and connected to the local fault poller. The method further comprising determining selected neighboring domains of a plurality of neighboring domains, wherein the selected neighboring domains comprise neighboring devices which can communicate with the local unreachable devices. The method further comprising requesting an operational test of the local unreachable devices from neighboring global fault pollers of the selected neighboring domains. The method further comprising receiving responses, via the neighboring global fault pollers, indicating whether the local unreachable devices are operational. The method further comprising, determining, based on the responses, a root cause device from the list of local unreachable devices.

According to another embodiment of the present disclosure, a processing system configured to perform the aforementioned method.

According to another embodiment of the present disclosure, a computer program product comprising a computer-readable storage medium having computer-readable program code embodied therewith, the computer-readable program comprising computer-readable program code configured to perform the aforementioned method.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-15, like numerals being used for corresponding parts in the various drawings.

DETAILED DESCRIPTION

Figure 1:
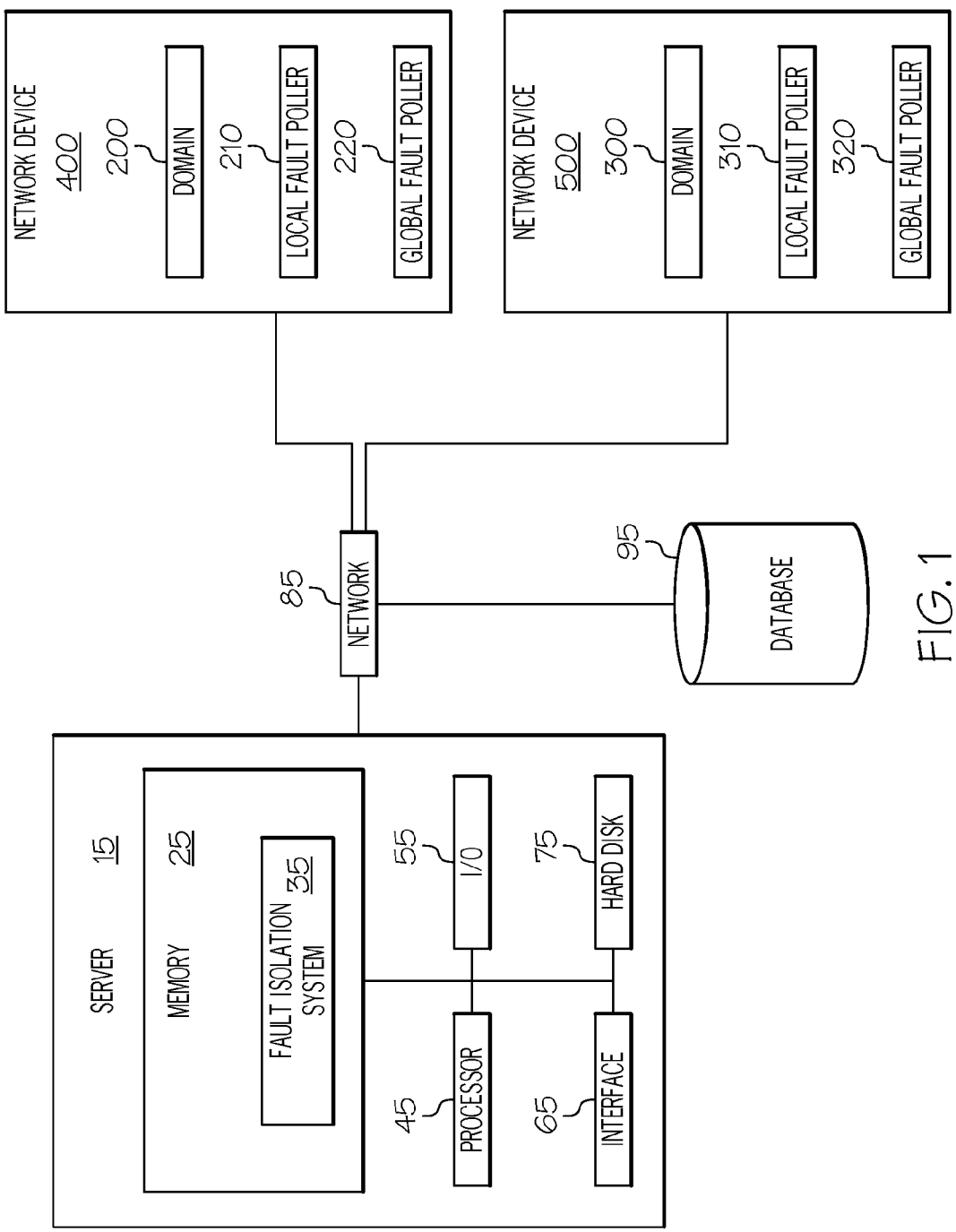
FIG. 1 illustrates a fault isolation ecosystem of a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Current fault monitoring solutions are confined to a specific domain. In other words, these solutions attempt fault isolation in a confined system. As a result, traditional fault isolation techniques often produce one network administrative ticket for each fault detected.

The flaws in current fault monitoring are best explained by an example. Assume domain A contains devices A, B, C, and D. In addition, the network fault poller for domain A may only communicate with device A by means of device B. Device A goes down, causing device B to go down. Current fault monitoring techniques may designate device B as the root cause because the fault poller cannot communicate with device A to determine if it is down. As a result, a network administrator would only realize device A is the main root cause after the network administrator resolves the issue with device B, and can communicate again with device A. The present disclosure describes, inter alia, a way to detect both root causes at the beginning, reducing downtime of the network by assigning two network administrative tickets to two different network administrators.

Accordingly, there is a need in the marketplace for a fault monitoring solution with the ability to identify and detect several root causes within a domain by monitoring network devices from several perspectives. Furthermore, there is a need for a fault monitoring solution with the ability to distribute device repair to several network administrators to reduce network downtime. The present disclosure provides, inter alia, a solution to overcome the weaknesses of traditional fault monitoring approaches. The present disclosure describes, inter alia, a more accurate root cause analysis and fault isolation management system using distributive fault polling across multiple domains. This unique solution may be extended to applications, databases, storage, etc. Embodiments of the present disclosure may address the above problems, and other problems, individually and collectively.

FIG. 1 illustrates a fault isolation ecosystem of a non-limiting embodiment of the present disclosure. The fault isolation ecosystem may include a server 15, a memory 25, a fault isolation system 35, a processor 45, an interface 65, an input and output ("I/O") device 55, and a hard disk 75. Fault isolation system 35 analyses may take place on the server 15 shown in FIG. 1. Processor 45 may be operable to load instructions from hard disk 75 into memory 25 and execute those instructions. Memory 25 may store computer-readable instructions that may instruct the server 15 to perform certain processes. I/O device 55 may receive one or more of data from another server or a network 85. The server 15 may be considered a processing system. Furthermore, fault isolation system 35 may perform analysis on any processing system, wherein the processing system comprises one or more processors.

Network 85 may comprise one or more entities, which may be public, private, or community based. Network 85 may permit the exchange of information and services among users/entities that are connected to such network 85. In certain configurations, network 85 may be a local area network, such as an intranet. Further, network 85 may be a closed, private network/cloud, in certain configurations, and an open network/cloud in other configurations. Network 85 may facilitate wired or wireless communications of information and provisioning of services among users that are connected to network 85.

The fault isolation ecosystem may also include a database 95 which may include, for example, additional servers, data storage, and resources. Fault isolation system 35 may receive additional data from database 95. Fault isolation system 35 may also store system performance, system analysis, and any information regarding the network management system on the database 95.

Fault isolation system 35 analyses may include examination of network devices 400 and 500, which may include a plurality of network domains (i.e., 200 and 300). Fault isolation system 35 may analyze past and current performance of network elements, performance relationships between network elements, performance relationships between network elements and network services, performance trends of network elements, etc. Fault isolation system 35 may communicate with or facilitate communications between domain 200 and domain 300, domain 200 and local fault poller 210, local fault poller 210 and global fault 220, global fault poller 220 and global fault poller 320, local fault poller 210 and local fault poller 310, etc.

Figure 2:
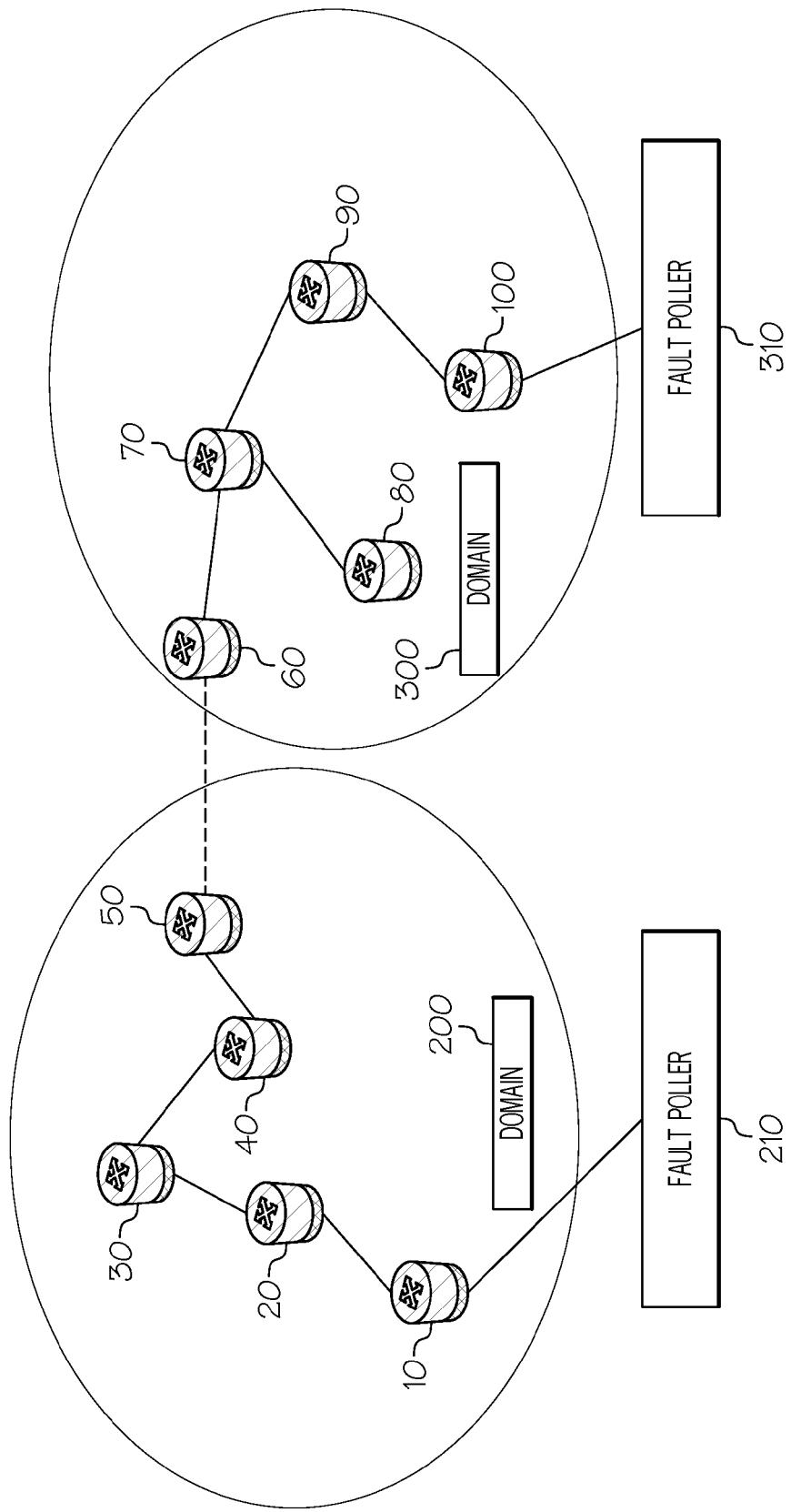
FIG. 2 illustrates a plurality of network devices for two domains during normal operation of a non-limiting embodiment of the present disclosure.

FIG. 2 illustrates a plurality of network devices for two domains during normal operation of a non-limiting embodiment of the present disclosure. Domain 200 encompasses network devices 10, 20, 30, 40, and 50. Fault poller 210 is dedicated to managing and monitoring the network devices of domain 200. Fault poller 210 is behind network device 10. As such, fault poller 210 would not be able to communicate with network devices 20, 30, 40, and 50 if network device 10 goes down. Domain 300 encompasses network devices 60, 70, 80, 90, and 100. Fault poller 310 is dedicated to managing and monitoring the network devices of domain 300. Fault poller 310 is behind network device 100. FIG. 2 also illustrates a communication connection between network devices 50 and 60. When all network devices are performing properly, as shown in FIG. 2, domain 200 may communicate with domain 300 from network device 50 to network device 60.

Figure 3:
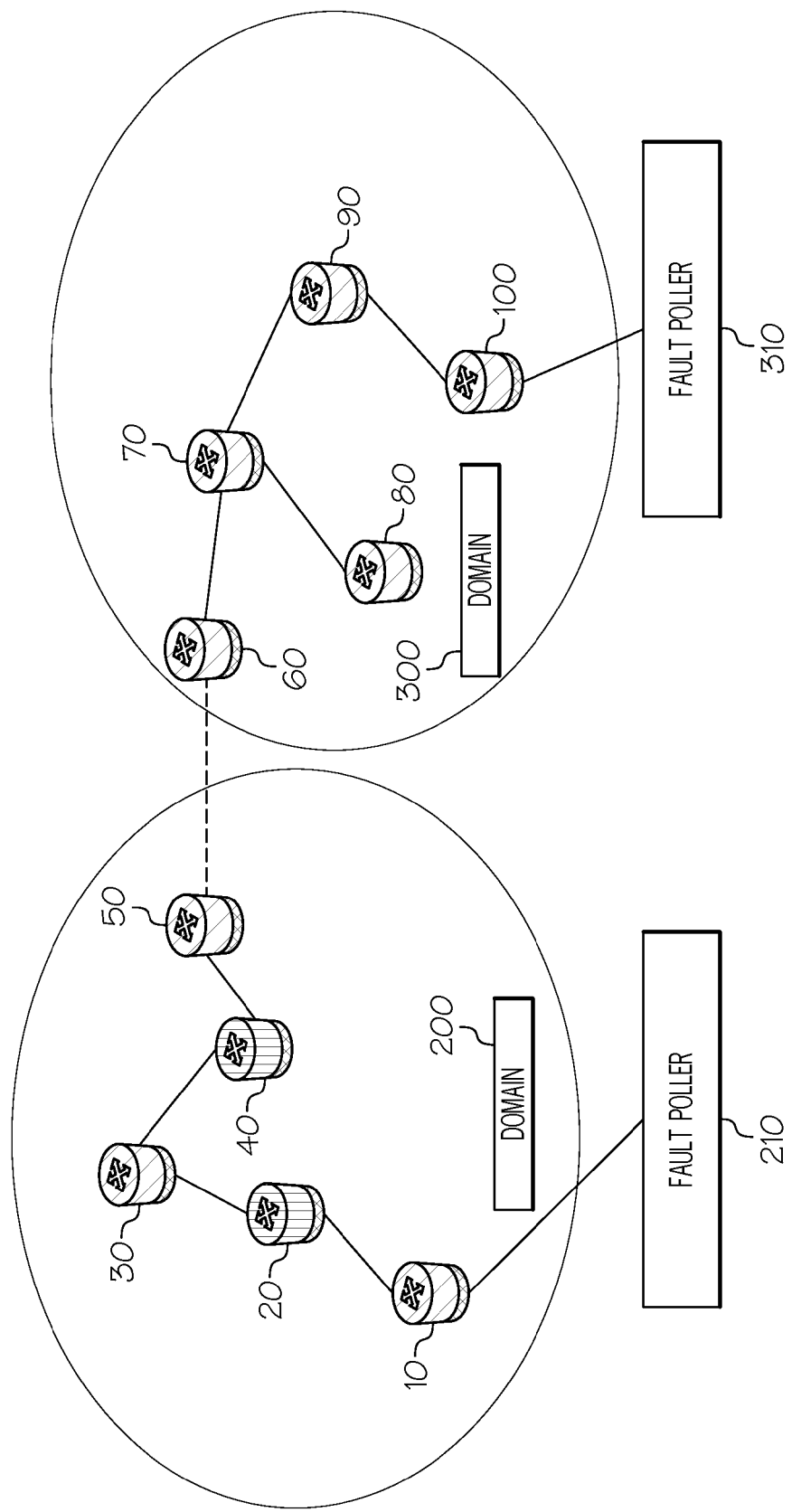
FIG. 3 illustrates a plurality of network devices for two domains during an instance of poor performance for a non-limiting embodiment of the present disclosure.

FIG. 3 illustrates a plurality of network devices for two domains during an instance of poor performance for a non-limiting embodiment of the present disclosure. In FIG. 3, network devices 20 and 40 are down. Network devices 10, 30, and 50 are still performing normally.

Figure 4:
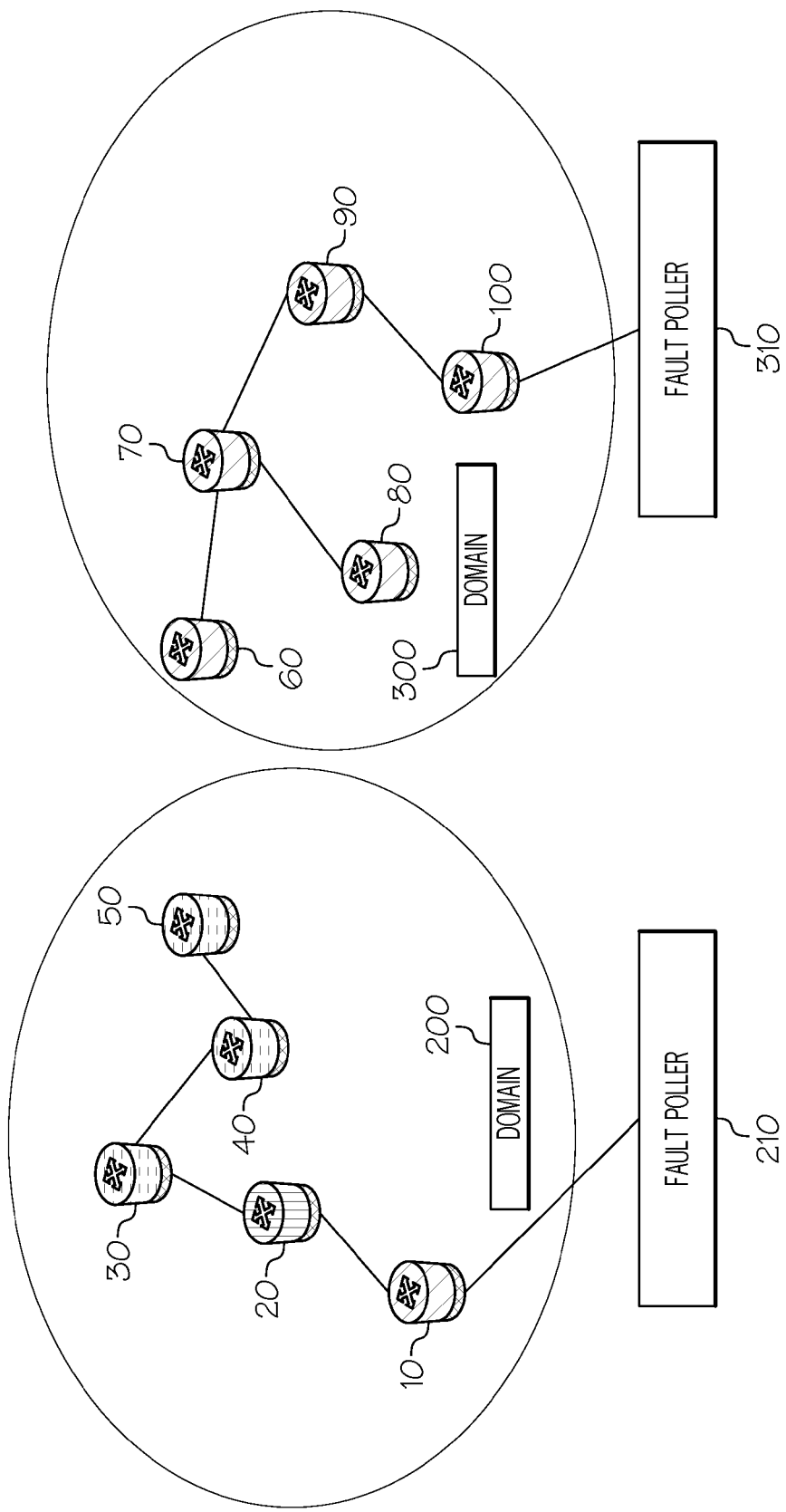
FIG. 4 illustrates a plurality of network devices from the perspective on a single fault poller during a down performance period for a non-limiting embodiment of the present disclosure.

FIG. 4 illustrates a plurality of network devices from the perspective on a single fault poller during a down performance period for a non-limiting embodiment of the present disclosure. In other words, FIG. 3 depicts which network devices are actually down and FIG. 4 depicts the network devices fault poller 210 views as down. Limiting fault poller 210 to fault detection within its domain 200, fault poller 210 would determine network device 20 is down and put in one ticket designating network device 20 as the root cause device. Traditionally, for a network device to be considered a root cause device, it should have at least one neighboring network device that is reachable. In domain 200, network devices 20, 30, 40, and 50 are all unreachable because fault poller 210 may only communicate with network devices 30, 40, and 50 via network device 20. Thus, if fault isolation capabilities were limited to fault poller 210, network device 20 would be labeled as the root cause device and network devices 30, 40, and 50 would be labeled symptomatic. Accordingly, there would one network administrative ticket requesting repair of network device 20.

Figure 5:
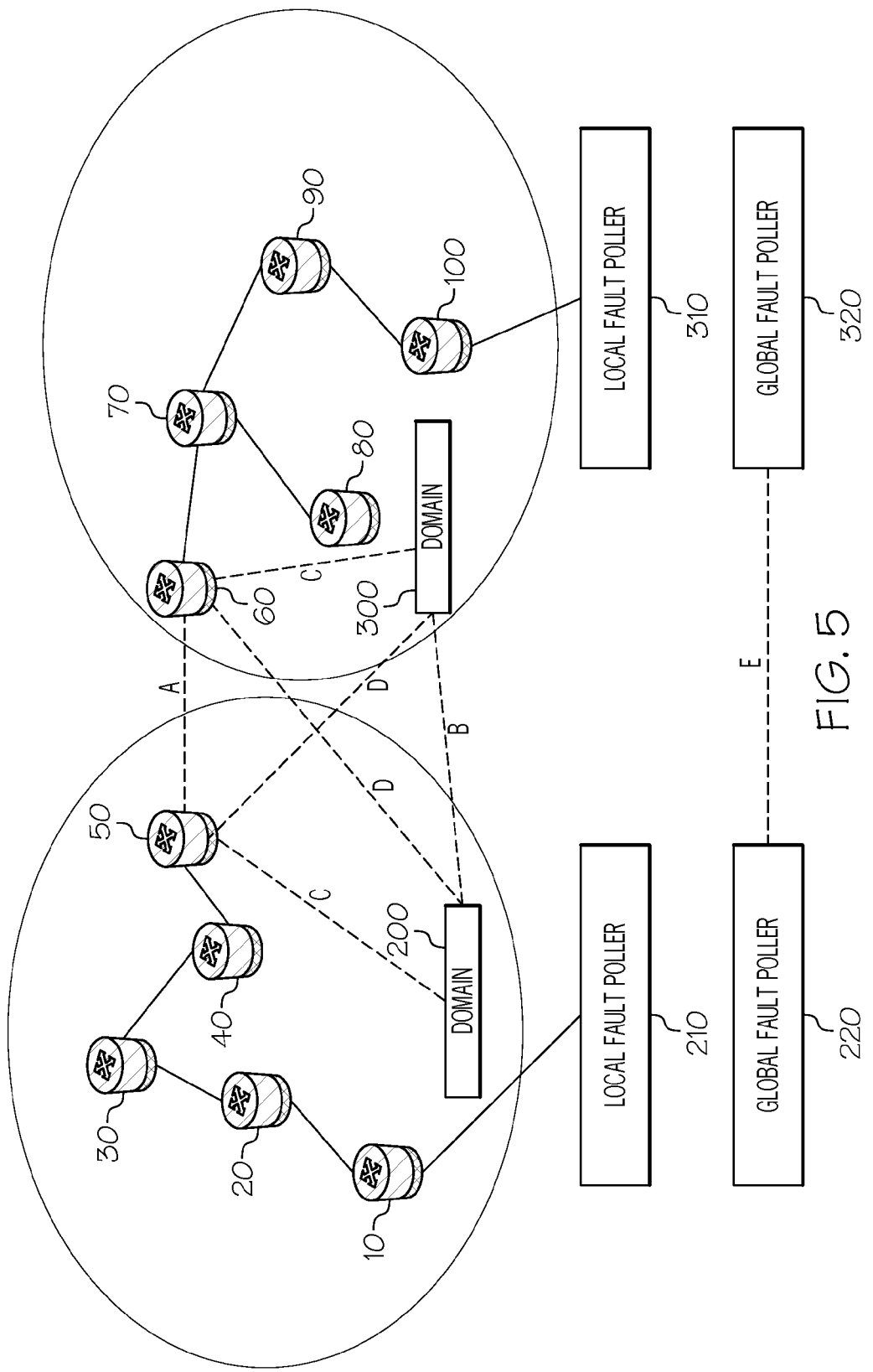
FIG. 5 illustrates neighboring relationships between network devices spread across domains in a non-limiting embodiment of the present disclosure.

FIG. 5 illustrates neighboring relationships between network devices spread across domains in a non-limiting embodiment of the present disclosure. The present disclosure overcomes the limitations of fault monitoring within a confined domain by means of a web of communication between network devices spread across multiple domains. FIG. 5 is illustrative of this concept, showing multiple connections A, B, and D between domains 200 and 300. Connection A is a communication relationship between border network devices 50 and 60. In FIG. 5, network devices 50 and 60 are considered 'border network devices' due to their connection A across domains. Connection B is a domain neighbor communication relationship wherein domain 200 may communicate with domain 300. Connection C is a communication relationship between a domain and a border network device. For example, domain 200 may communicate with border network device 50. Likewise, domain 300 may communicate with border network device 60 via connection C. Connection D indicates a communication relationship between domains and neighboring border network devices. Thus, domain 200 may communicate with neighboring border network device 60, and domain 300 may communicate with border network device 50.

In addition to these communication channels, FIG. 5 illustrates global fault pollers 220 and 320 connected via connection E. Connection E indicates a communication relationship between global fault pollers, which may act as a communication channel between domains. Global fault pollers 220 and 320 communicate with their respective local fault pollers 210 and 310. A user may add any of the communication relationships in FIG. 5, or automatic discovery may be used to determine said relationships. These connections or communication channels are described from one perspective for simplicity. These connections may exist for each network device individually depending on the neighboring domain in focus.

Figure 6:
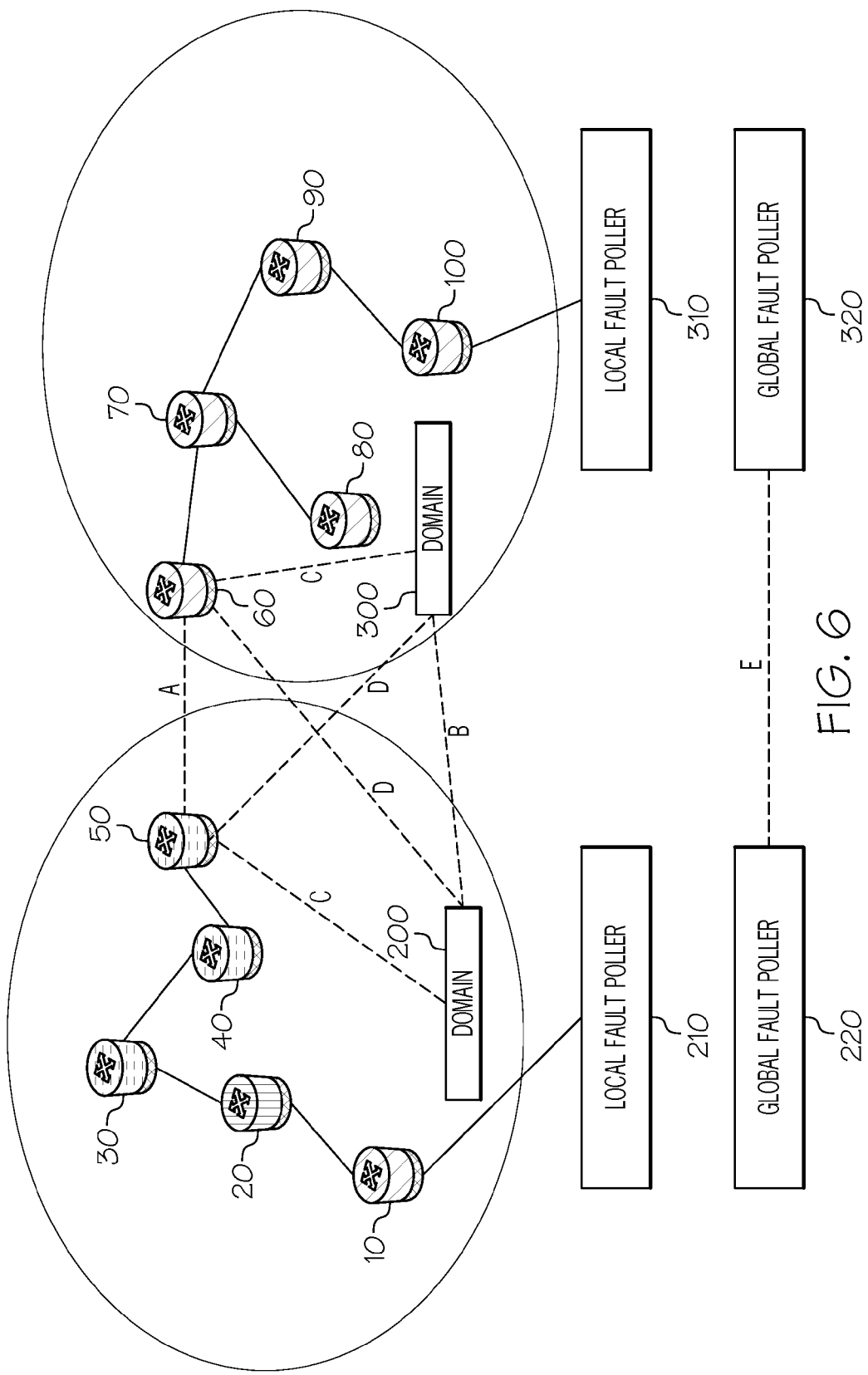
FIG. 6 illustrates neighboring relationships between network devices spread across domains during a poor performance period in a non-limiting embodiment of the present disclosure.

FIG. 6 illustrates neighboring relationships between network devices spread across domains during a poor performance period in a non-limiting embodiment of the present disclosure. The present disclosure overcomes the limitations of fault monitoring depicted in FIG. 4 by means of a web of communication between network devices spread across multiple domains, as depicted in FIG. 5. As in FIG. 4, local fault poller 210 determines network device 20 a root cause and network devices 30, 40, and 50 symptomatic of the root cause. However, according to the present disclosure, if any border network devices are symptomatic, the relevant fault poller will communicate with neighboring fault pollers to determine whether or not the border network devices are reachable. In the present case, local fault poller 210 determines network device 50 is symptomatic and a border network device in domain 200. The local fault poller 210 may determine this via connection C, as shown in FIG. 6. Local fault poller 210 may notify global fault poller 220 about border network device 50, and global fault poller 220 may communicate this information to global fault poller 320 via connection D. Global fault poller 220 may use connection D of border network device 50 to identify neighboring domain 300. Global fault poller 220 may request global fault poller 320 to determine the functionality of the symptomatic network devices 30, 40, and 50 in domain 200.

Figure 7:
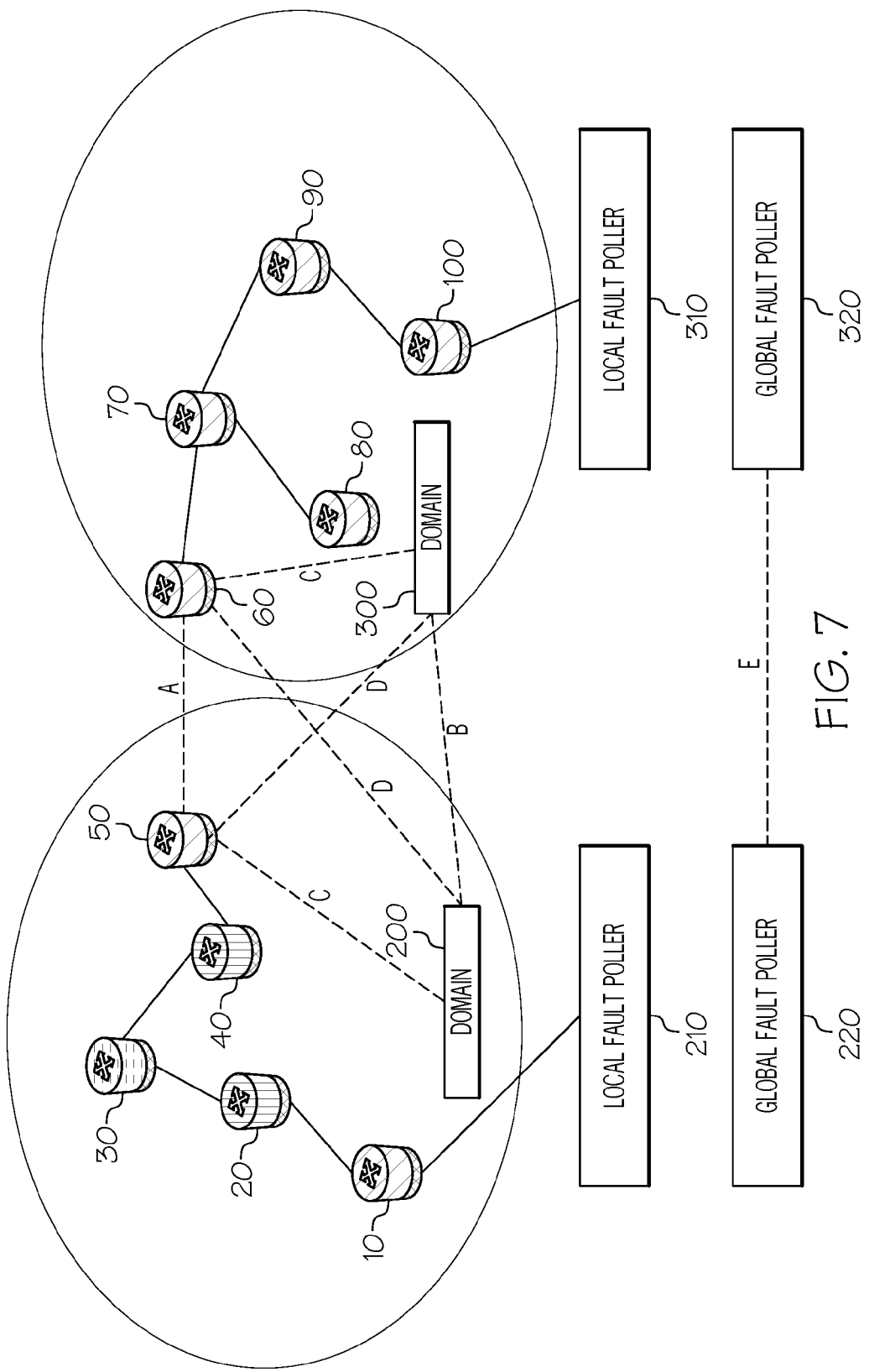
FIG. 7 illustrates neighboring communication relationships between network devices spread across domains during a poor performance period in a non-limiting embodiment of the present disclosure.

FIG. 7 illustrates neighboring communication relationships between network devices spread across domains during a poor performance period in a non-limiting embodiment of the present disclosure. FIG. 7 depicts the results of the communications described regarding FIG. 6. At the request of global fault poller 220, global fault poller 320 determines that border network device 50 is reachable, or operational, and network devices 30 and 40 are unreachable, or not operational. Global fault poller 320 notifies global fault poller 220, which in turn notifies local fault poller 210. Due to web architecture of the system, global fault poller 220 may communicate with other global fault pollers that interact with domains in which network devices 30 and 40 are considered neighboring border devices. In other words, global fault poller 220 may repeat this process with other domains to gather more information about the operational status of the network devices in domain 200. Local fault poller 210 may then aggregate this information and determine whether network device 20 is the only root cause in domain 200. As shown in FIG. 7, local fault poller 210 would determine, given the additional information, that both network device 20 and network device 40 should be designated as root cause devices. FIGS. 8-14 further describe this procedure.

Figure 8:
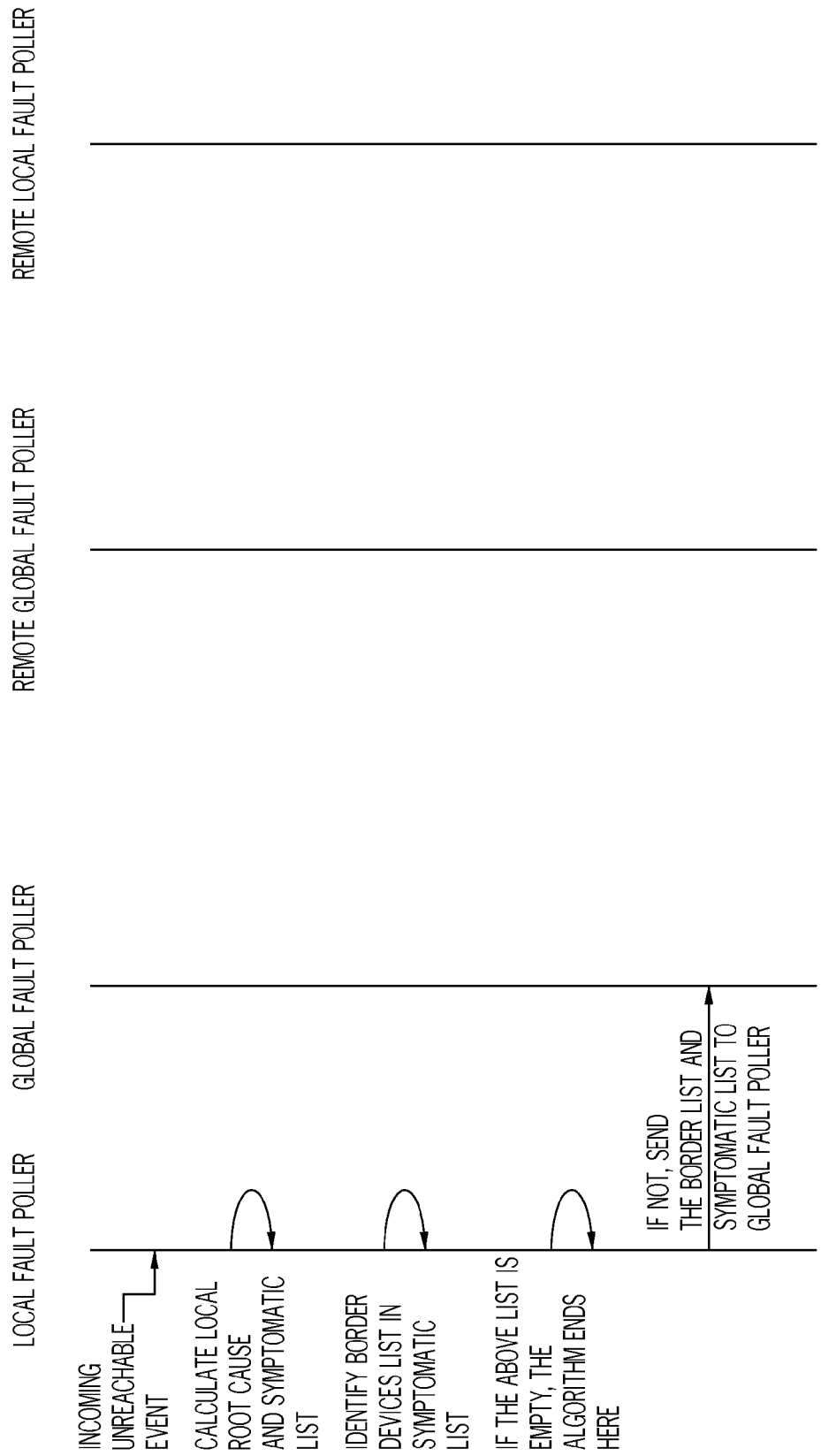
FIG. 8 illustrates a sequence diagram depicting local fault poller activity in a non-limiting embodiment of the present disclosure.

FIG. 8 illustrates a sequence diagram depicting local fault poller activity in a non-limiting embodiment of the present disclosure. A local fault poller may determine an incoming unreachable event, whereas, for example, a network device has gone down and is no longer reachable. The local fault poller may calculate a fault domain and identify a root cause and a list of symptomatic devices. A fault domain may indicate how performance of each of the network devices affects performance of the network devices. The fault domain may determine a topology of the network devices within a domain. Determining a local fault domain may include mapping performance relationships for each of the network devices within a domain. Furthermore, a probable performance impact may be predicted for the local domain based on the fault domain.

A local fault poller may create the symptomatic list of devices and a list of border devices using the aforementioned connection relationships, including connection C. If the symptomatic list is empty, the determined fault domain is deemed correct, and the procedure ends. If the symptomatic list is not empty, they local fault poller may determine a list of unique neighboring domains. Next, the local fault poller may notify a global fault poller of the neighboring domains, the border network devices, and the symptomatic list.

Figure 9:
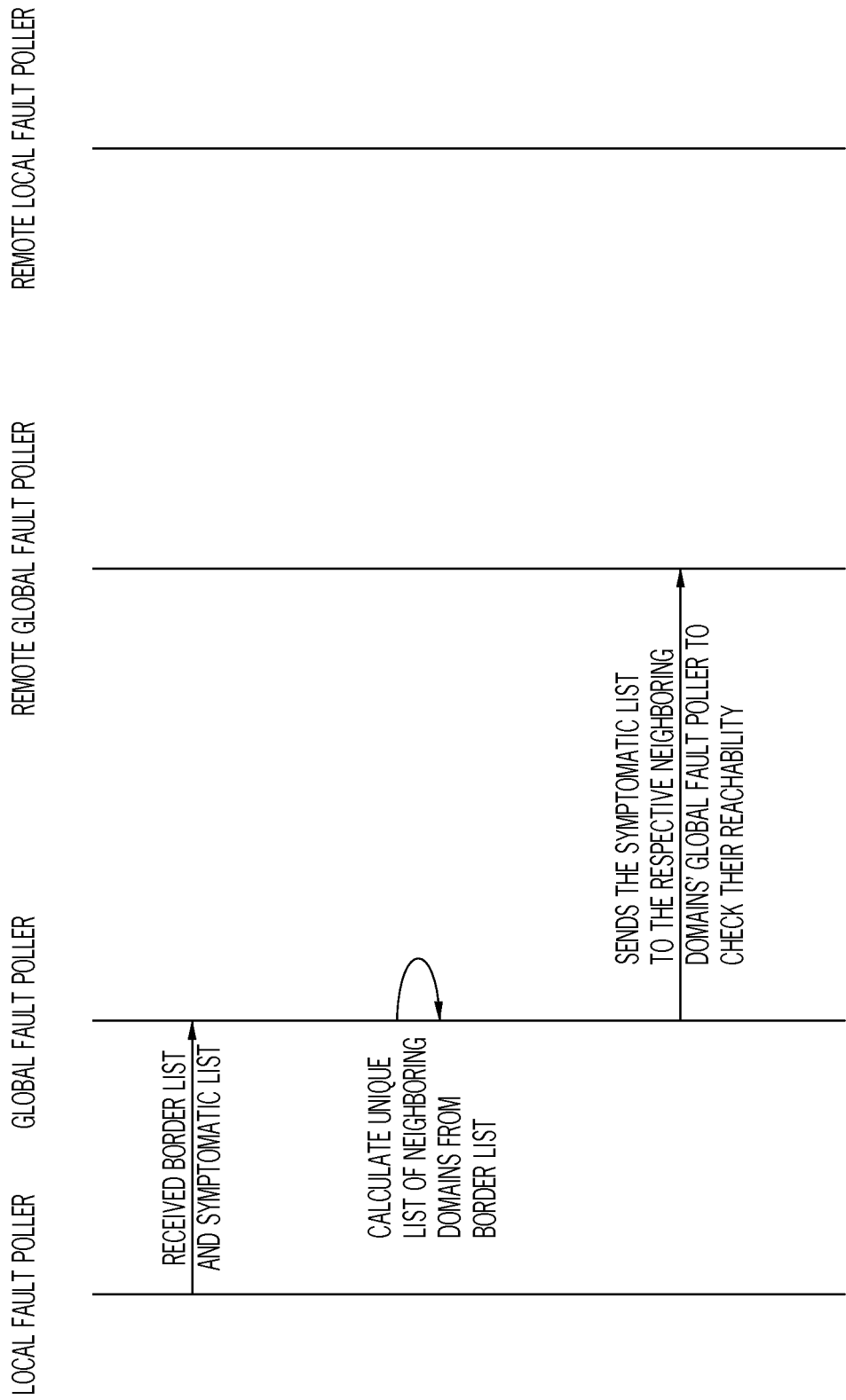
FIG. 9 illustrates a sequence diagram depicting global fault poller activity in a non-limiting embodiment of the present disclosure.

FIG. 9 illustrates a sequence diagram depicting global fault poller activity in a non-limiting embodiment of the present disclosure. After receiving notice of neighboring domains, border network devices, and a symptomatic list, the global fault poller may calculate a unique list of neighboring domains from the list of border network devices. Next, the global fault poller may send the symptomatic list to the respective neighboring domains' global fault pollers, in order to determine whether or not the listed border network devices are operational. The respective global fault pollers of neighboring domains, each referred to as a remote global fault poller, may determine the reachability of the border devices within its respective domain.

Figure 10:
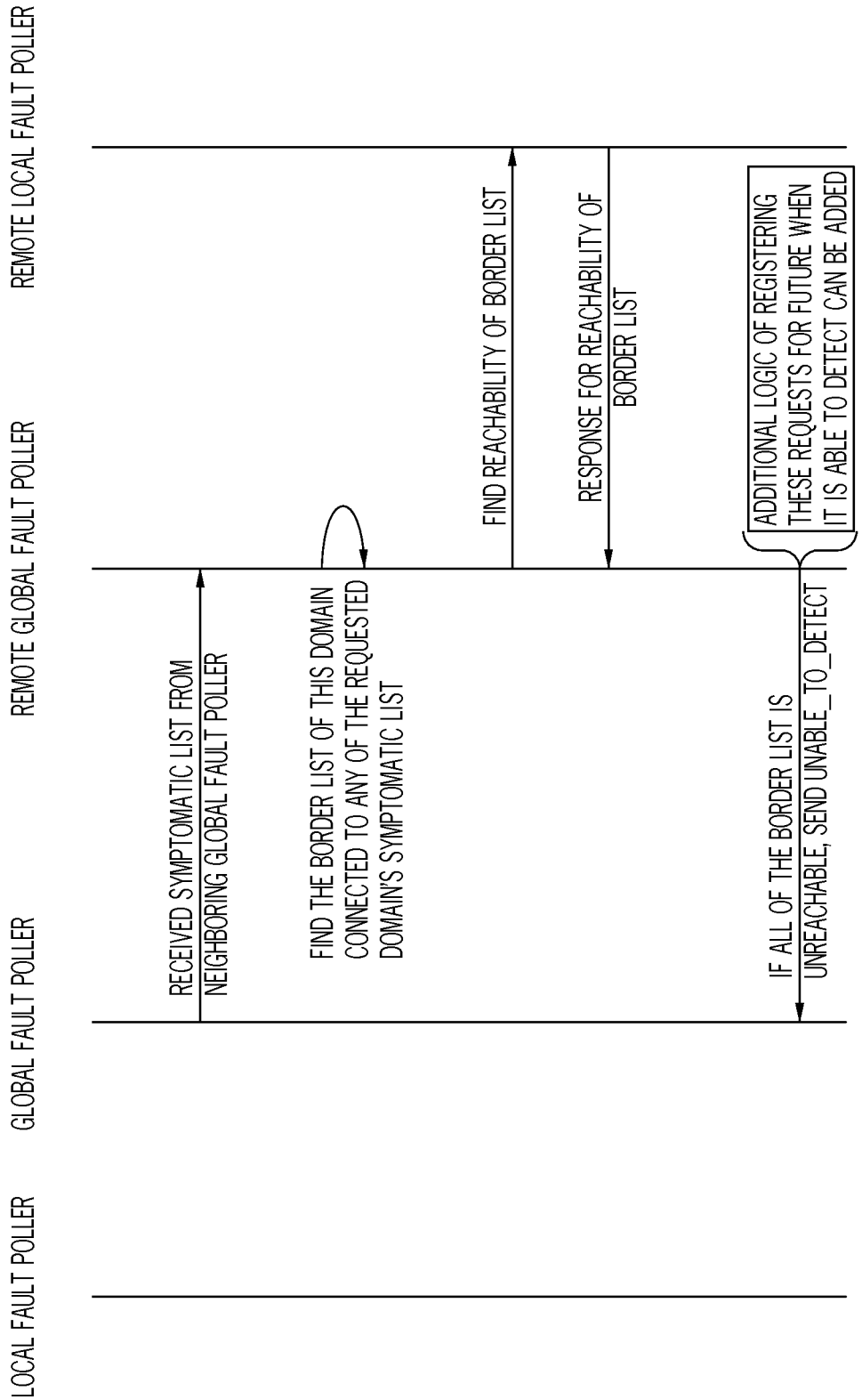
FIG. 10 illustrates a sequence diagram depicting remote global fault poller and remote local fault poller activity in a non-limiting embodiment of the present disclosure.

FIG. 10 illustrates a sequence diagram depicting remote global fault poller and remote local fault poller activity in a non-limiting embodiment of the present disclosure. In FIG. 10, the respective remote global fault poller of each neighboring domain receiving a request communicates with the respective remote local fault poller of each neighboring domain. The respective remote local fault pollers determine first the reachability of border network devices within the neighboring domains. These border network devices may be connected to the network devices listed on the symptomatic list. The remote local fault pollers respond to the respective remote global fault pollers with a determination of the reachability of each relevant border network device on the symptomatic list. Additional logic may further register these requests and responses between remote local fault pollers and remote global fault pollers, as well as between remote global fault pollers and global fault pollers.

Figure 11:
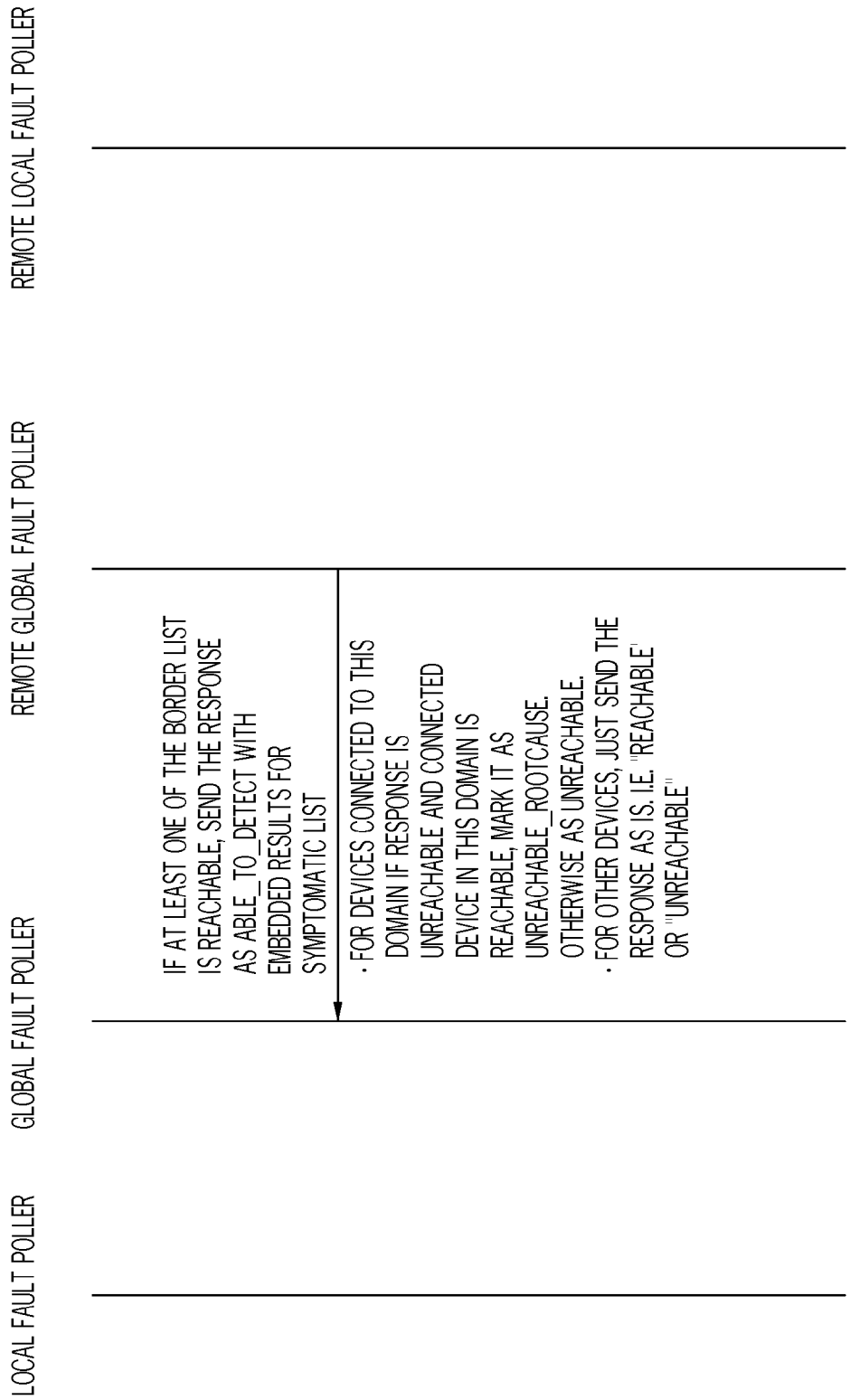
FIG. 11 illustrates a sequence diagram depicting remote global fault poller activity in a non-limiting embodiment of the present disclosure.

FIG. 11 illustrates a sequence diagram depicting remote global fault poller activity in a non-limiting embodiment of the present disclosure. If, for example, all of the border network devices are unreachable via the remote local fault poller, the remote local fault poller may send a response of 'UNABLE TO DETECT' to the remote global fault poller, which may forward this message to the global fault poller. In another example, if all of the border network devices are reachable via the remote local fault poller, the remote local fault poller may send a response of 'ABLE TO DETECT' with embedded reachability status for all requested devices to the remote global fault poller, which may forward this message to the global fault poller. If, for example, network devices connected via connection D to the domain of the remote local fault poller return an unreachable status, yet is still reachable via connection A, then the remote local fault poller may send a response of 'UNREACHABLE ROOT CAUSE.' If, for example, the check run by the remote local fault poller should fail, a response may be sent to the remote global fault poller stating 'UNABLE TO DETECT.' Additionally, these checks may be set at intervals to monitor when the devices on the symptomatic list become available.

Figure 12:
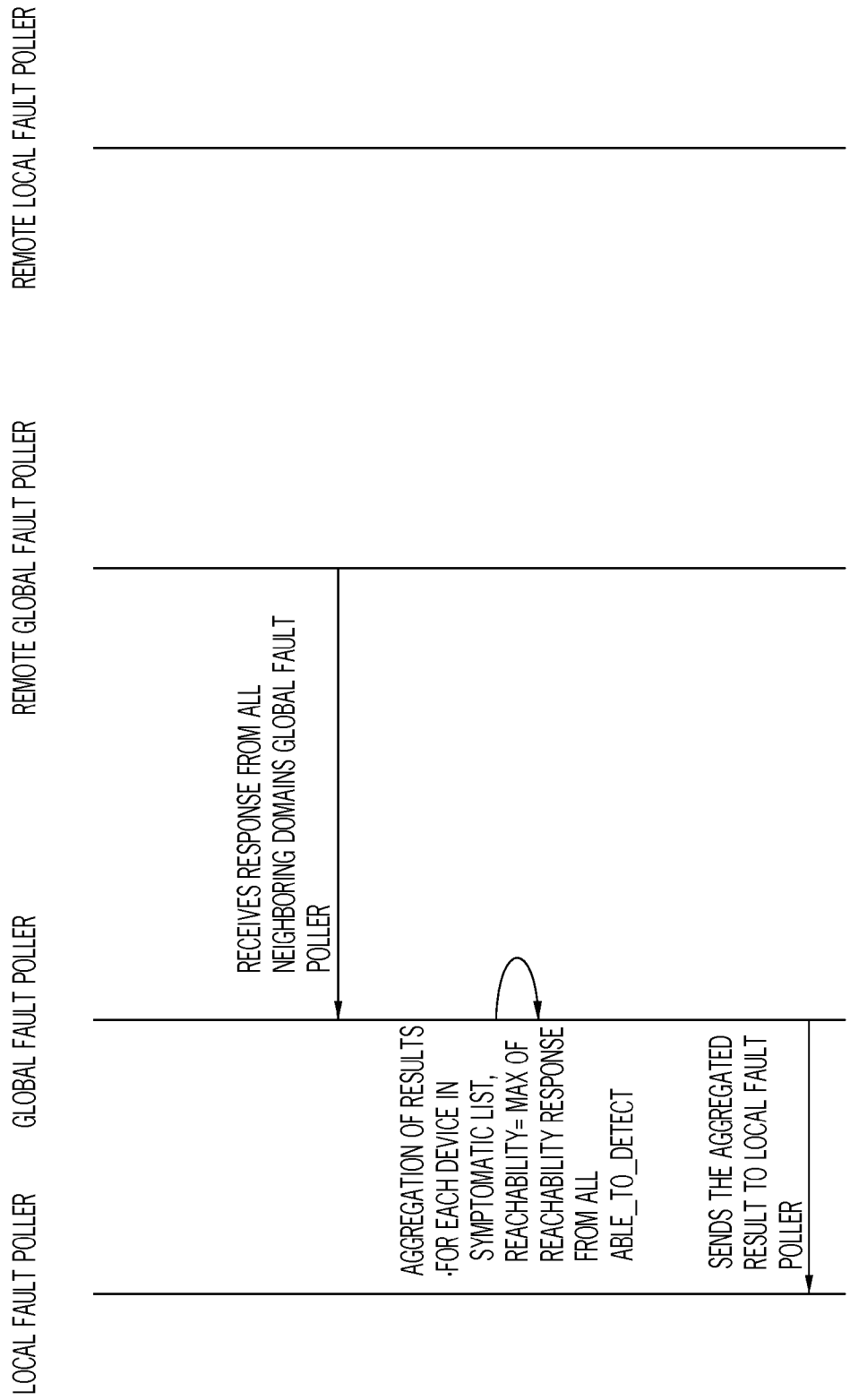
FIG. 12 illustrates a sequence diagram depicting global fault poller activity in response to remote global fault poller activity in a non-limiting embodiment of the present disclosure.

FIG. 12 illustrates a sequence diagram depicting global fault poller activity in response to remote global fault poller activity in a non-limiting embodiment of the present disclosure. In FIG. 12, the global fault poller receives responses from all remote global fault pollers of respective neighboring domains. The global fault poller may then aggregate the results for each network device in the symptomatic list to determine the reachability of each device. The global fault poller may then forward this analysis to the local fault poller, such that the local fault poller may determine the root cause device with the additional information.

Figure 13:
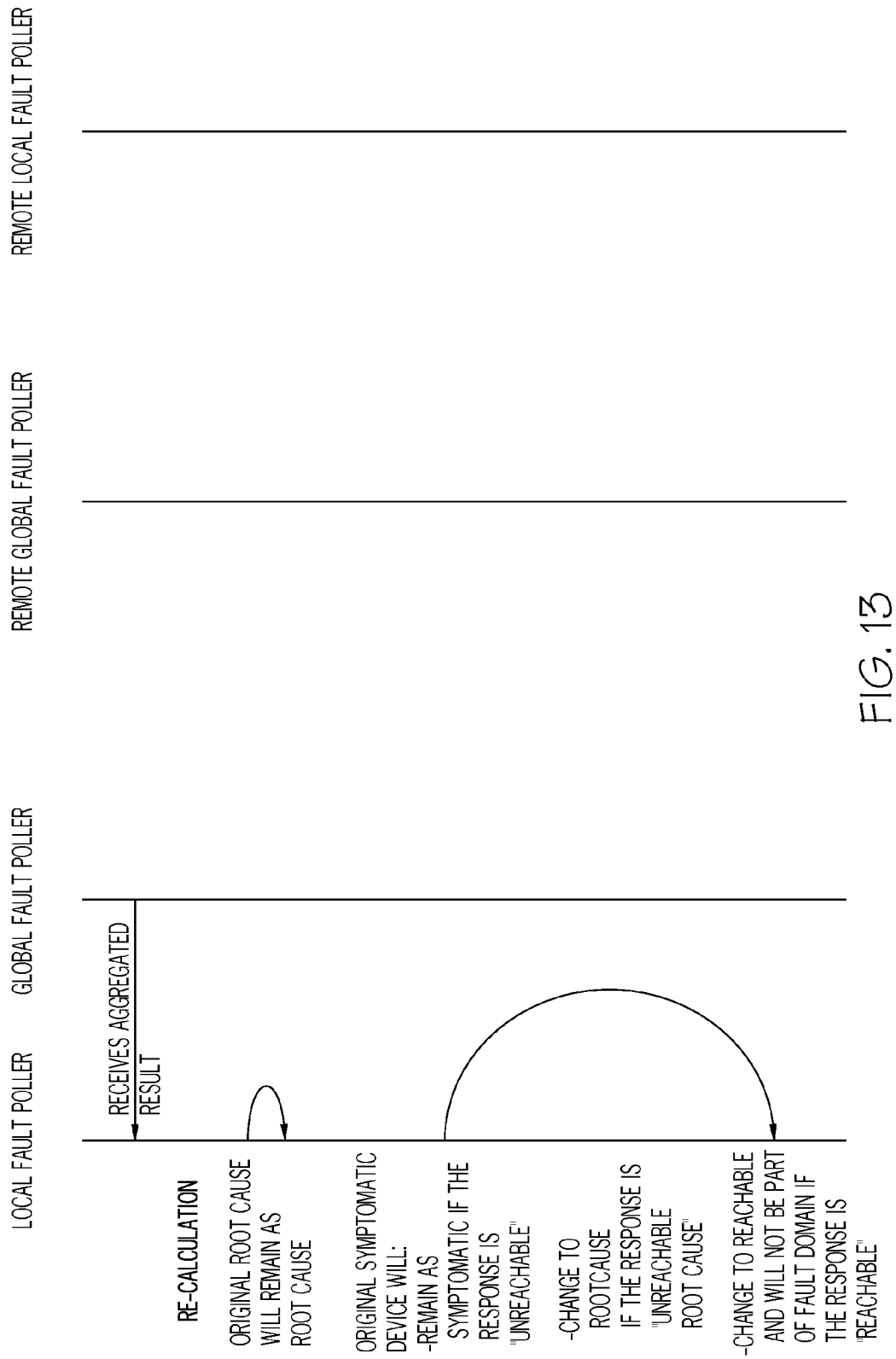
FIG. 13 illustrates a sequence diagram depicting local fault poller activity in response to remote global fault poller and global fault poller activity in a non-limiting embodiment of the present disclosure.

FIG. 13 illustrates a sequence diagram depicting local fault poller activity in response to remote global fault poller and global fault poller activity in a non-limiting embodiment of the present disclosure. Upon receiving aggregated results from the global fault poller, the local fault poller may recalculate the original root caused based on the additional analysis. In some scenarios, the analysis may confirm that the original root cause device is to blame for poor system performance. However, depending on the aggregated results, the local fault poller may determine that the original root cause device is actually symptomatic of another root cause device with in the domain. An original symptomatic device may remain as symptomatic if the aggregated response determined the device as 'UNREACHABLE.' Additionally, an original symptomatic device may be categorized as a root cause if the aggregated response determined the device as 'UNREACHABLE ROOT CAUSE.' Furthermore, an original symptomatic device may be determined to be reachable, and be removed from the symptomatic list and the fault domain, if the aggregated response determined the device as 'REACHABLE.'

Figure 14:
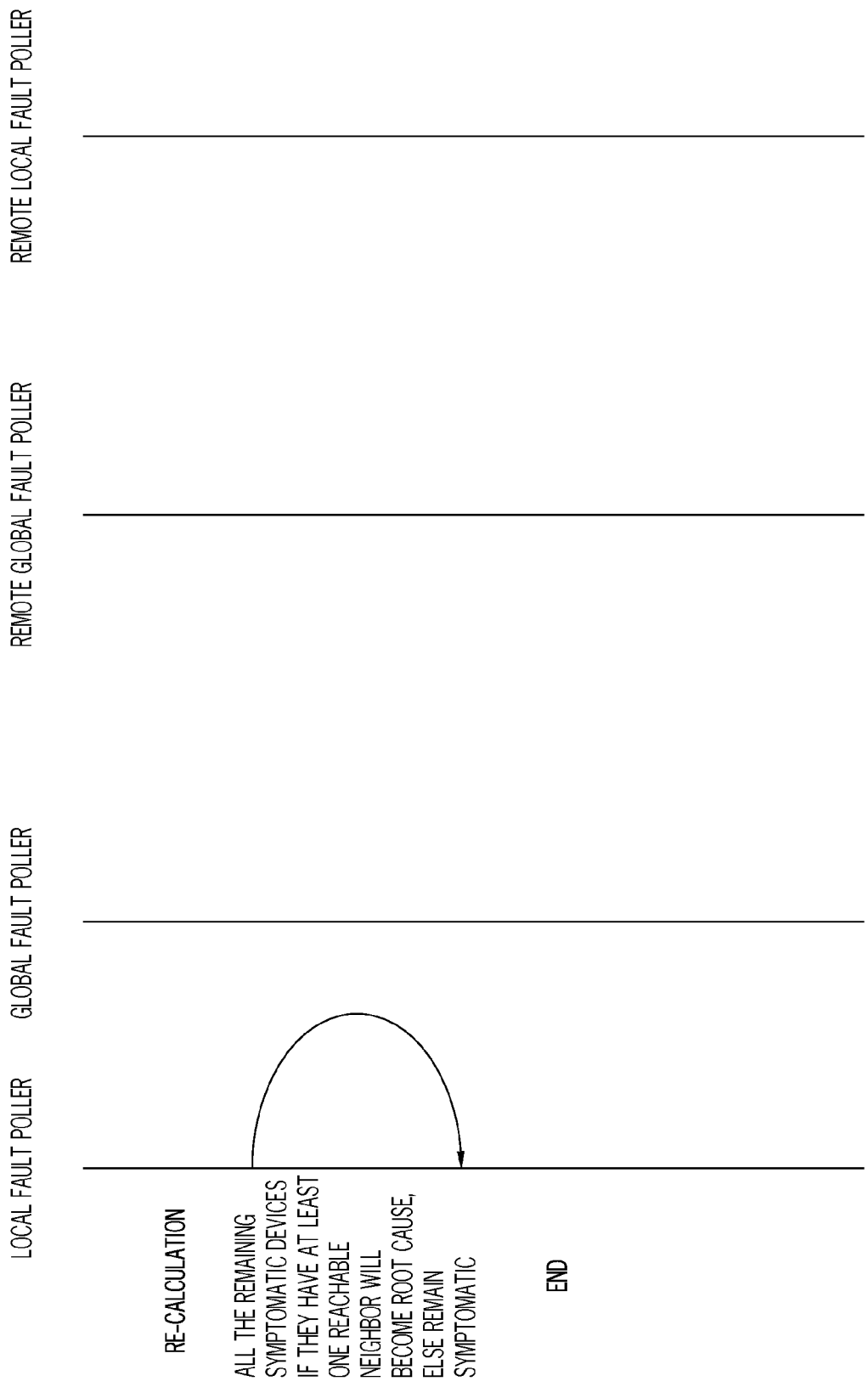
FIG. 14 illustrates a sequence diagram depicting local fault poller activity in determining a root cause device in a non-limiting embodiment of the present disclosure.

FIG. 14 illustrates a sequence diagram depicting local fault poller activity in determining a root cause device in a non-limiting embodiment of the present disclosure. In some scenarios, all the remaining symptomatic devices may become root cause if they have at least one reachable neighbor.

Figure 15:
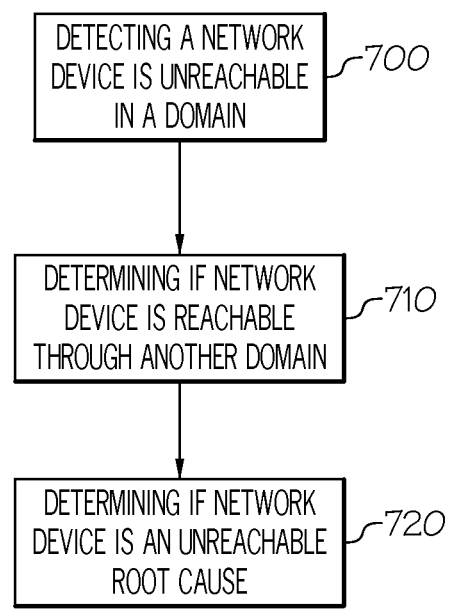
FIG. 15 illustrates a flow diagram depicting a fault isolation process in a non-limiting embodiment of the present disclosure.

FIG. 15 illustrates a flow diagram depicting a fault isolation process in a non-limiting embodiment of the present disclosure. In step 700, fault isolation system 35 may detect that a network device is unreachable in a domain. Furthermore, in step 710, fault isolation system 35 may determine if the network device is reachable through another domain. Additionally, in step 720, fault isolation system 35 may determine if the network device is an unreachable root cause.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in a server diagnostic context, but rather that embodiments of the invention may be used in any transaction having a need to monitor information of any type. The specification and the described examples are considered as exemplary only, with the true scope and spirit of the invention indicated by the following claims.

What is claimed is:

1. A method, comprising:
   determining, via a local fault poller, a list of local unreachable devices of a plurality of devices within a local domain, wherein the local unreachable devices are coupled for communication with the local fault poller;
   determining selected neighboring domains of a plurality of neighboring domains, wherein the selected neighboring domains are outside the local domain and comprise neighboring devices which are coupled for communication with the local unreachable devices, each neighboring domain having a respective neighboring global fault poller;
   requesting an operational test of the local unreachable devices within the local domain by the respective neighboring global fault pollers of the selected neighboring domains outside the local domain;
   receiving responses, via the respective neighboring global fault pollers of the selected neighboring domains outside the local domain, indicating whether the local unreachable devices within the local domain are operational;
   determining, based on the responses, a root cause device from the list of local unreachable devices.

2. The method of claim 1, wherein the local fault poller manages the plurality of devices within the local domain.

3. The method of claim 1, wherein determining, via a local fault poller, the root cause device, further comprises:
   determining a local fault domain, wherein the local fault domain indicates how performance of each of the plurality of devices affects performance of the plurality of devices.

4. The method of claim 3, wherein determining the local fault domain further comprises:
   determining a topology of the plurality of devices within the local domain.

5. The method of claim 4, wherein determining the local fault domain further comprises:
   mapping performance relationships for each of the plurality of devices within the local domain; and
   predicting a probable performance impact for the local domain based on the local fault domain.

6. The method of claim 1, further comprising:
   mapping a communication relationship for each local unreachable device, wherein the communication relationship defines respective neighboring devices within the selected neighboring domains which are coupled for communication with the local unreachable devices.

7. The method of claim 1, wherein determining, based on the responses, the root cause device from the list of local unreachable devices, further comprises:
   determining a probable impact on local domain services.

8. The method of claim 1, further comprising:
   determining a local domain solution to limit downtime of the root cause device; and
   implementing the local domain solution.

9. The method of claim 1, wherein the root cause device prevents the local fault poller from communicating with the local unreachable devices.

10. The method of claim 1, wherein notifying the network administrator of the probable fault based on pre-fault performance characteristics of the at least one of the plurality of network elements further comprises:
determining a timeframe in which the probable fault is likely to occur.

11. A system comprising:
a memory; and
a processor in communication with the memory, the processor configured to:
determine, via a local fault poller, a list of local unreachable devices of a plurality of devices within a local domain, wherein the local unreachable devices are coupled for communication with the local fault poller;
determine selected neighboring domains of a plurality of neighboring domains, wherein the selected neighboring domains are outside the local domain and comprise neighboring devices which are coupled for communication with the local unreachable devices, each neighboring domain having a respective neighboring global fault poller;
request an operational test of the local unreachable devices within the local domain by the respective neighboring global fault pollers of the selected neighboring domains outside the local domain;
receive responses, via the respective neighboring global fault pollers of the selected neighboring domains outside the local domain, indicating whether the local unreachable devices within the local domain are operational; and
determine, based on the responses, a root cause device from the list of local unreachable devices.

12. The system of claim 11, wherein the local fault poller manages the plurality of devices within the local domain.

13. The system of claim 12, wherein when determining, via a local fault poller, the root cause device, the processor is further configured to:
determine a local fault domain, wherein the local fault domain indicates how performance of each of the plurality of devices affects performance of the plurality of devices.

14. The system of claim 13, wherein when determining the local fault domain, the processor is further configured to:
determine a topology of the plurality of devices within the local domain.

15. The system of claim 14, wherein when determining the local fault domain, the processor is further configured to:
map performance relationships for each of the plurality of devices within the local domain; and
predict a probable performance impact for the local domain based on the local fault domain.

16. The system of claim 12, wherein the processor is further configured to:
map a communication relationship for each local unreachable device, wherein the communication relationship defines neighboring devices within the selected neighboring domains which are coupled for communication with the local unreachable devices.

17. The system of claim 11, wherein when determining, based on the responses, the root cause device from the list of local unreachable devices, the processor is further configured to:
determine a probable impact on local domain services.

18. The system of claim 11, wherein the processor is further configured to:
determine a local domain solution to limit downtime of the root cause device; and
implement the local domain solution.

19. The system of claim 11, wherein when notifying the network administrator of the probable fault based on pre-fault performance characteristics of the at least one of the plurality of network elements, the processor is further configured to:
determine a timeframe in which the probable fault is likely to occur.

20. A computer program product comprising:
a non-transitory computer-readable storage medium having computer-readable program code embodied therewith, the computer-readable program code comprising:
computer-readable program code configured to determine, via a local fault poller, a list of local unreachable devices of a plurality of devices within a local domain, wherein the local unreachable devices are coupled for communication with the local fault poller;
computer-readable program code configured to determine selected neighboring domains of a plurality of neighboring domains, wherein the selected neighboring domains are outside the local domain and comprise neighboring devices which are coupled for communication with the local unreachable devices, each neighboring domain having a respective neighboring global fault poller;
computer-readable program code configured to request an operational test of the local unreachable devices within the local domain by the respective neighboring global fault pollers of the selected neighboring domains outside the local domain;
computer-readable program code configured to receive responses, via the respective neighboring global fault pollers of the selected neighboring domains outside the local domain, indicating whether the local unreachable devices within the local domain are operational;
computer-readable program code configured to determine, based on the responses, a root cause device from the list of local unreachable devices.

* * * * *